United States Patent
Kim et al.

(10) Patent No.: US 7,961,651 B2
(45) Date of Patent: Jun. 14, 2011

(54) METHOD AND SYSTEM FOR MANAGING ENERGY IN SENSOR NETWORK ENVIRONMENT USING SPANNING TREE

(75) Inventors: Hoon Kim, Suwon-si (KR); Seong Taek Hwang, Pyeongtaek-si (KR); Chang Jin Suh, Seoul-si (KR); Jae Hun Cho, Suwon-si (KR); Ji Soo Shin, Suwon-si (KR); Kyung Mi Kim, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 397 days.

(21) Appl. No.: 11/964,763

(22) Filed: Dec. 27, 2007

(65) Prior Publication Data

US 2008/0172191 A1    Jul. 17, 2008

(30) Foreign Application Priority Data

Jan. 11, 2007   (KR) .................. 10-2007-0003118

(51) Int. Cl.
*H04L 12/28* (2006.01)
(52) U.S. Cl. .................. 370/256; 370/328; 370/338
(58) Field of Classification Search .................. 370/338, 370/408, 352, 256, 221, 401, 337, 351, 328, 370/310, 400; 709/224, 248
See application file for complete search history.

(56) References Cited

U.S. PATENT DOCUMENTS

| | | | |
|---|---|---|---|
| 6,744,740 B2 * | 6/2004 | Chen | 370/255 |
| 7,035,240 B1 * | 4/2006 | Balakrishnan et al. | 370/338 |
| 7,339,897 B2 * | 3/2008 | Larsson et al. | 370/252 |
| 7,369,512 B1 * | 5/2008 | Shurbanov et al. | 370/254 |
| 7,483,397 B2 * | 1/2009 | Meier et al. | 370/256 |
| 2002/0196745 A1 * | 12/2002 | Frouin et al. | 370/254 |
| 2003/0063585 A1 * | 4/2003 | Younis et al. | 370/331 |
| 2005/0216227 A1 * | 9/2005 | Warrior et al. | 702/181 |
| 2007/0233835 A1 * | 10/2007 | Kushalnagar et al. | 709/223 |
| 2008/0013566 A1 * | 1/2008 | Smith et al. | 370/447 |
| 2008/0316917 A1 * | 12/2008 | Farkas et al. | 370/221 |

OTHER PUBLICATIONS

Yoon, Chang-June C.J.; Patent Application Publication No. US 2006/0215588 A1; Publication Date: Sep. 28, 2006; "Energy-Efficient Network Protocol and Node Device. . .,". . . .
Varaiya, Pravin; et al.; Patent Application Publication No: US 2005/0122231 A1; Publication Date: Jun. 9, 2005; "Power Efficient Wireless System for Sensor Network;". . . .

* cited by examiner

*Primary Examiner* — Michael J Moore, Jr.
(74) *Attorney, Agent, or Firm* — Cha & Reiter, LLC

(57) ABSTRACT

A method for managing energy in a sensor network environment using a spanning tree includes the steps of collecting amount of remaining energy of nodes at a predetermined cycle by a base station in a region having a number of clusters a number of nodes forming a spanning tree in each cluster; assigning a number of links for connecting the nodes to each cluster; determining a maximum number of allowable links of the nodes; and updating the spanning tree based on the maximum number of allowable links.

16 Claims, 10 Drawing Sheets

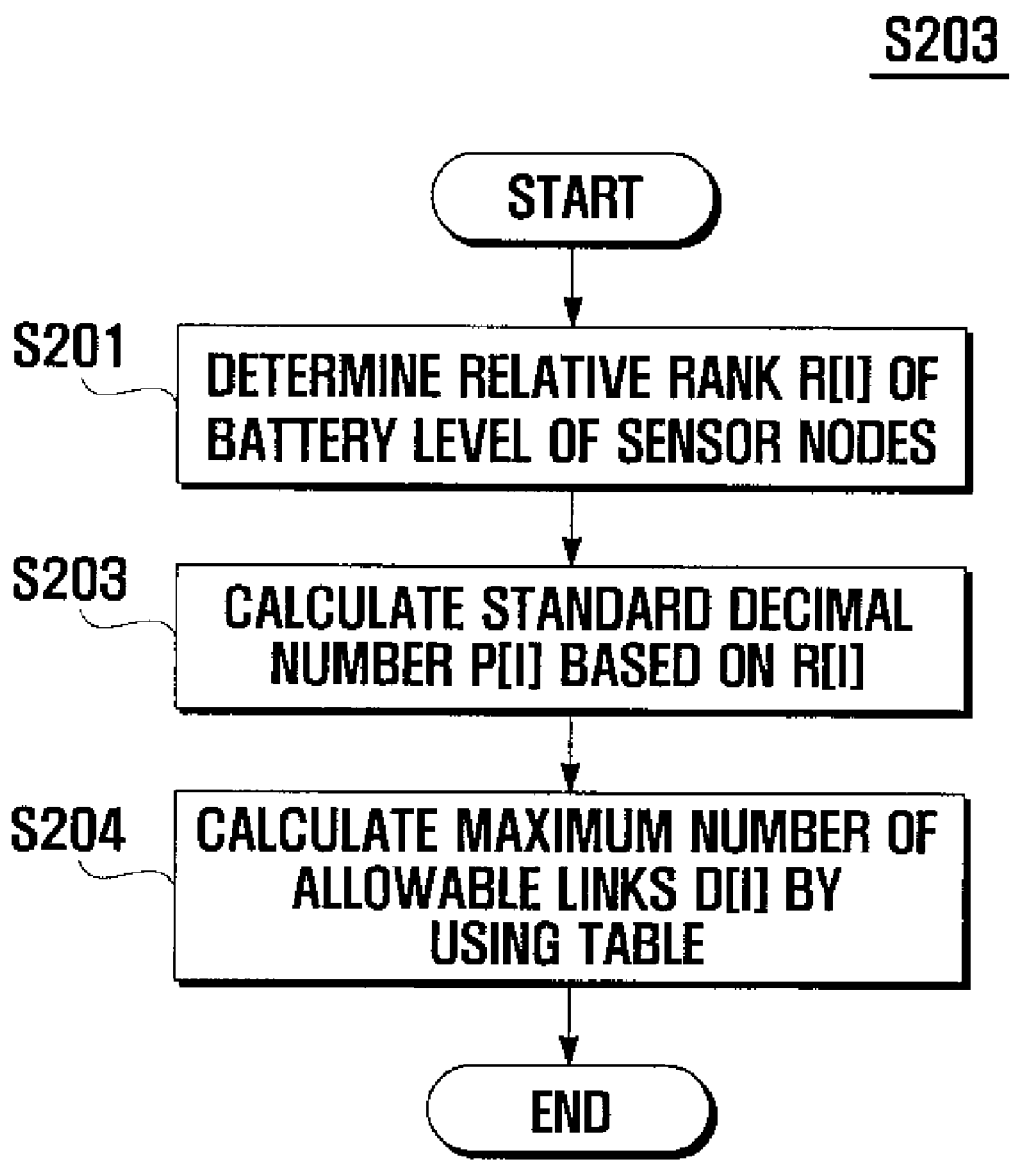

METHOD AND SYSTEM FOR MANAGING ENERGY IN SENSOR NETWORK ENVIRONMENT USING SPANNING TREE

CLAIMS OF PRIORITY

This application claims the benefit of the earlier filing date, pursuant to 35 USC 119, to that patent application entitled "METHOD AND SYSTEM FOR MANAGING ENERGY IN SENSOR NETWORK ENVIRONMENT USING SPANNING TREE" filed in the Korean Intellectual Property Office on Jan. 11, 2007 and assigned Serial No. 2007-0003118, the contents of which are incorporated herein by reference.

BACKGROUND OF THE INVENTION

1. Field of the Invention

The present invention relates energy management in a sensor network environment. More particularly, the present invention relates to a method and a system for managing energy in a sensor network environment using a spanning tree, wherein the maximum number of allowable links is controlled to maintain the amount of energy consumed by sensor nodes distributed in the sensor network substantial uniform.

2. Description of the Related Art

As is generally known in the art, a sensor network is used to grasp the characteristics in a region (e.g. temperature), accurately locate an event, conduct remote monitoring, etc. Particularly, a number of sensors are distributed in a region and information is collected from the sensors and analyzed to extract desired data.

Such a process for distributing sensors in a sensor network requires that, when the sensors are using a limited power source (e.g. batteries), the sensors be distributed based on their energy efficiency. Although energy efficiency can be made substantially uniform by distributing specific sensors uniformly (i.e. at the same distance) over a region, it is substantially impossible to maintain the same distance between the sensors. When information collected by a number of sensors needs to be transmitted to an information collection device, such as a BS (Base Station), it is efficient to transmit information to a specific sensor from remaining sensors when energy efficiency is considered.

However, conventional sensor networks have a problem in that their sensor nodes do not consume energy uniformly. More particularly, the sensor nodes are installed at arbitrary locations and are connected in various network configurations. This is reflected in the routing path(s) for connecting the sensor nodes. As a result, when the sensor nodes transmit measurement data to the root of the spanning tree (i.e. BS), they consume different amounts of reception energy due to the varying number of their child nodes. In addition, the sensor nodes consume different amounts of transmission energy due to the different distance to their parent nodes. Furthermore, some sensor nodes may consume more energy in order to play their own role; some sensor nodes may have a faulty battery and begin their task at a much lower energy level than other sensor nodes; and, due to different environments in which the sensor nodes are located, some sensor nodes may consume energy more quickly than other sensor nodes.

As mentioned above, sensor nodes in the sensor network consume different amounts of energy as time elapses, and thus, the sensor nodes come to have different amounts of remaining energy. As a result, some sensor nodes have a shorter life than other sensor nodes. Such perishing of sensor nodes further shortens the life of remaining sensor nodes, as a new links are constituted to provide connection in the sensor network. Therefore, it is necessary to provide a method for maintaining the amount of energy consumed by the sensor nodes to be substantially uniform.

SUMMARY OF THE INVENTION

The present invention has been made in view of the above problems by providing a method and a system for managing energy in a sensor network environment using a spanning tree so that the amount of energy consumed by each sensor node in the sensor network, which constitutes the spanning tree, is substantially uniform.

In accordance with an aspect of the present invention, there is provided a method of managing energy in a sensor network environment using a spanning tree, the method including the steps of collecting amount of remaining energy of nodes at a predetermined cycle by a base station in a region having a number of clusters, a number of nodes forming a spanning tree in each cluster, assigning a number of links for connecting the nodes to each cluster, determining a maximum number of allowable links of the nodes and updating the spanning tree based on the maximum number of allowable links.

In accordance with another aspect of the present invention, there is provided a system for managing energy in a sensor network environment using a spanning tree, the system including nodes forming a spanning tree in each region based on link connection, the nodes updating the spanning tree at a predetermined cycle and a base station setting up the predetermined cycle, collecting information regarding an amount of remaining energy of the nodes and distributed location of the nodes at the predetermined cycle so as to determine a maximum number of allowable links of the nodes, calculating the spanning tree based on the determined maximum number of allowable links, and transmitting a calculation result to the nodes.

BRIEF DESCRIPTION OF THE DRAWINGS

The above and other aspects, features and advantages of the present invention will be more apparent from the following detailed description in conjunction with the accompanying drawings, in which:

FIG. 5 is a flowchart showing a first method for determining the maximum number of allowable links according to an embodiment of the present invention;

DETAILED DESCRIPTION OF THE INVENTION

Figure 1:
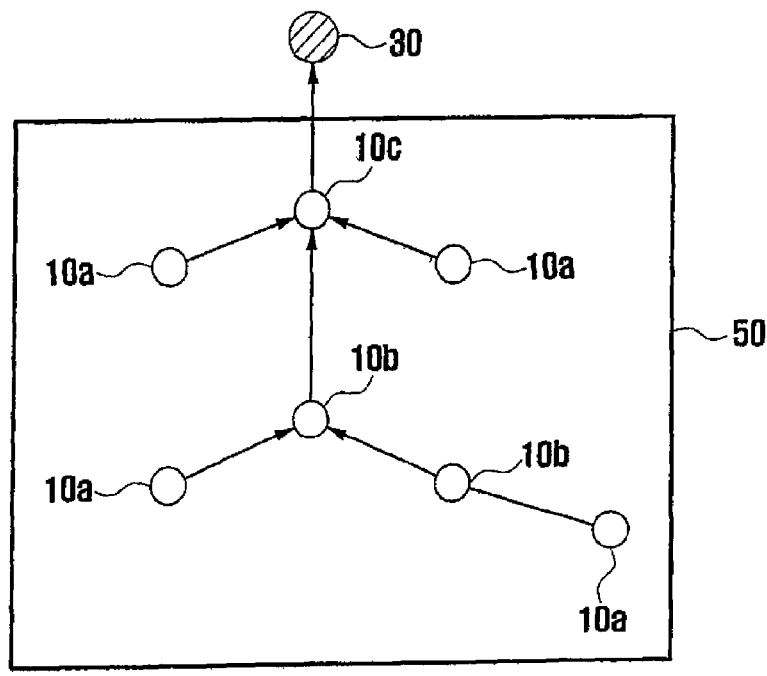
FIG. 1 shows a network system according to an embodiment of the present invention.

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

Those skilled in the art will recognize the terminologies used in the following description and the claims are not to be interpreted based on conventions or dictionaries, but based on the principle that the inventor can properly define terminologies in order to best define the invention. In addition, the construction described and shown in the specification and drawings corresponds only to a preferred embodiment of the present invention. Various changes or modifications of the embodiment are possible without departing from the scope of the invention.

The method and system for managing energy according to the present invention aim to maintain substantially uniform energy consumption in a sensor network region having a number of sensor nodes distributed therein so as to collect information while being connected to one another by links, which constitute a spanning tree, so that information can be transmitted among the sensor nodes. The sensor network according to the present invention may use various types of sensors, for example, earthquake measurement sensors, temperature sensors, humidity sensors, microorganism measurement sensors, and CBR sensors.

In the following description of an energy management system according to the present invention, a child node refers to a lower sensor node adapted to transmit its data to another sensor node, a parent node refers to a sensor node adapted to receive data from the child node, process the data, and transmit it to another parent node or a handling node and a handling node refers to a sensor node adapted to collect data from the child node or the parent node, process the data, and transmit it to a base station. A process for collecting and processing data by the parent and handling nodes may include a process for receiving data from a lower sensor node and a process for compressing/processing the received data for efficient data transmission.

FIG. 1 shows a network system to which a spanning tree link connection according to an embodiment of the present invention is applied.

It will be assumed in the following description that the sensor network system according to the present invention has a conventional environment, i.e. the sensor nodes have non-rechargeable power, while the base station (hereinafter, referred to as BS) has unlimited power. In addition, one of the sensor nodes, i.e. a handling node, periodically receives data from other sensor nodes, processes the data, and transmits the processed data to the BS. Furthermore, the BS and the sensor nodes remain stationary, and all sensor nodes consume a similar amount of transmission energy when transmitting data. In such an environment, the BS periodically checks the amount of remaining energy of the sensor nodes in the sensor network, and adjusts the maximum number of allowable links among the sensor nodes distributed in the sensor network at a predetermined cycle so as to disperse links connected to a specific sensor node. As a result, all sensor nodes come to consume substantially same amount of energy. As used herein, the predetermined cycle refers to a round cycle at which each sensor node transmits data, more particularly, at which the sensor node collects data and transmits it to the BS. For example, the BS may divide the entire sensor network life at a predetermined proportion and determine the cycle for each portion. The entire sensor network life can be calculated based on consideration of how long the sensor nodes can consume energy from the time of fabrication, as well as allowable errors.

Referring to FIG. 1, a network system according to an embodiment of the present invention includes a number of sensor nodes 10 distributed in a region so as to constitute a spanning tree while maintaining the maximum number of allowable links; a sensor network 50 defined by the distributed sensor nodes 10; and a BS 30 adapted to receive data from a specific sensor node so that the sensor network 50 can collect the data and adjust the amount of remaining energy of the sensor nodes 10 and the maximum number of allowable links among them at a predetermined cycle so that respective sensor nodes 10 consume energy uniformly.

The nodes 10 include sensor nodes 10 adapted to collect data and a handling node 10c adapted to receive data collected by other sensor nodes 10, and transmit the received data to the BS 30. The sensor nodes 10 include child nodes 10a adapted to collect data and transmit the collected data to other sensor nodes connected to them via links (i.e. parent nodes 10b) and parent nodes 10b adapted to receive data from their child nodes 10, process the data, and transmit the processed data to other sensor nodes 10 or the handling node 10c. From the standpoint of the parent nodes 10b, the child nodes 10a are regarded as lower sensor nodes; and, from the standpoint of the child nodes 10a, the parent nodes 10b are regarded as upper sensor nodes. Even among the parent nodes 10b, those transmitting data are regarded as lower in position than those receiving data, which are regarded as upper sensor nodes. In this regard, the handling node 10c is said to be an upper sensor node. The link connection among the sensor nodes 10 according to the present invention follows a minimum spanning tree type, in which each sensor node 10 constitutes a link within the maximum number of allowable links. As mentioned above, lower sensor nodes transmit data to upper sensor nodes; and upper sensor nodes receive data from lower sensor nodes.

The sensor network 50 defines a region in which the link-connected sensor nodes 10 are distributed. The sensor network 50 transmits information, which is collected by a number of interconnected sensor nodes 10, to the external BS 30.

The BS 30 receives information, which is collected by respective sensor nodes 10 included in the sensor network 50, and analyzes the information. Considering the energy efficiency, the BS 30 connects the handling node 10c among the sensor nodes 10 included in the sensor network 50 to a link and collects information from the connected handling node 10c. The handling node 10 receives information from other sensor nodes 10, which are connected to the handling node 10c via links, compresses the information, and transmits it to the BS 30. The BS 30 may control the sensor nodes 10 so as to construct a new spanning tree at a predetermined cycle, e.g. round cycle at which the sensor nodes 10 transmit data. In other words, the BS 30 adjusts the maximum number of allowable links among sensor nodes 10, which are included in each spanning tree, and reconfigures the spanning tree at a predetermined cycle so that link connections concentrated in specific sensor nodes 10 (e.g. parent nodes 10b) are dispersed to maintain the energy consumption substantially uniform.

The construction of a network system according to an embodiment of the present invention has been described. A method for maintaining the amount of energy consumed by sensor nodes 10 distributed in the sensor network 50 using a spanning tree according to the above-mentioned embodiment of the present invention substantially uniform will now be described.

The present invention creates a new spanning tree at every cycle $T_c$(the number of rounds and uses it as the routing path of the sensor network 50. Note that the round represents a time period for forming a spanning tree in a sensor network, which can be set arbitrarily by a user. That is, it represents a time for forming a round can be varied based on a characteristic or a method of energy management of a sensor network. Thus, the round indicates a period for forming a spanning tree, rather than a specific time period. According to an energy management method according to an embodiment of the present invention, the spanning tree is configured to have a number of links the same as or less than the maximum number of allowable links, which has been calculated for each sensor node 10. The number of links of each sensor node 10 is determined based on the amount of remaining energy in a region, in which a new routing path is to be created, and the geographical distribution of the sensor network 50. Particularly, the number of links of a sensor node 10 refers to the number of links constituting a spanning tree used by the corresponding sensor node 10 as a routing path.

According to an embodiment of the present invention, the amount of remaining energy is obtained by subtracting the amount of energy consumed depending on the link number (i.e. the number of links connecting each sensor node to its lower sensor nodes) from the amount of initial energy. The geographical distribution of the sensor network 50 is preferably determined in such a manner that, considering the type of arrangement of the sensor nodes 10, lower sensor nodes linked to a specific upper sensor node are adjacent to the upper sensor node.

To this end, the energy management method according to an embodiment of the present invention determines the number of links allowed to each sensor node when a spanning tree needs to have a number of links, including a predetermined percentage of free links.

After a handling node 10c is determined, the spanning tree according to the present invention regards the handling node 10c as a root node, and calls the first node leading to the root node a parent node and remaining adjacent nodes child nodes. In a spanning tree, the path leading to the destination is one and the same, which means that there is only one parent node except for the root node. When a network has N sensor nodes 10, the spanning tree consists of (N−1) links. In this case, the total number of links of all sensor nodes 10 is 2(N−1). The BS 30 according to an embodiment of the present invention determines the maximum number of links allowed to each sensor node 10 in advance, calculates a spanning tree satisfying this determined maximum number, and transmits corresponding information to each sensor node 10. It can be said that, when the total number of allowable links of all sensor nodes 10 is 3(N−1), for example, 50% of the allowable links are free.

It is to be noted that the number of allowable links does not mean the number of actual links, but the upper limit of links allowed to each sensor node 10. Therefore, the number of actually formed links is equal to or smaller than the number of allowable links. For example, if the number of allowable links is 1, the link number is 1 in all cases; and, if the number of allowable links is 2, the link number is usually 2. When the number of allowable links is larger than 2, the number of actual links may be smaller than this value.

When a high percentage of the number of allowable links is determined to be free, i.e., it greatly differs from the number of actual links, this represents an undesirable condition. If less than 10% is free, the range of allowable links has a smaller margin. This is also undesirable in that the resulting spanning tree costs much more than an optimal spanning tree having no limitation regarding the link number. Considering these facts, 10-20% of links are free in the energy management method according to an embodiment of the present invention is desirable. The percentage of 10-20% is determined based on the standard deviation of the amount of remaining energy of a cluster, and will hereinafter be referred to as "x."

A process for forming a spanning tree in a sensor network according to the present invention will now be described in detail with reference to FIGS. 2 and 3.

Figure 2:
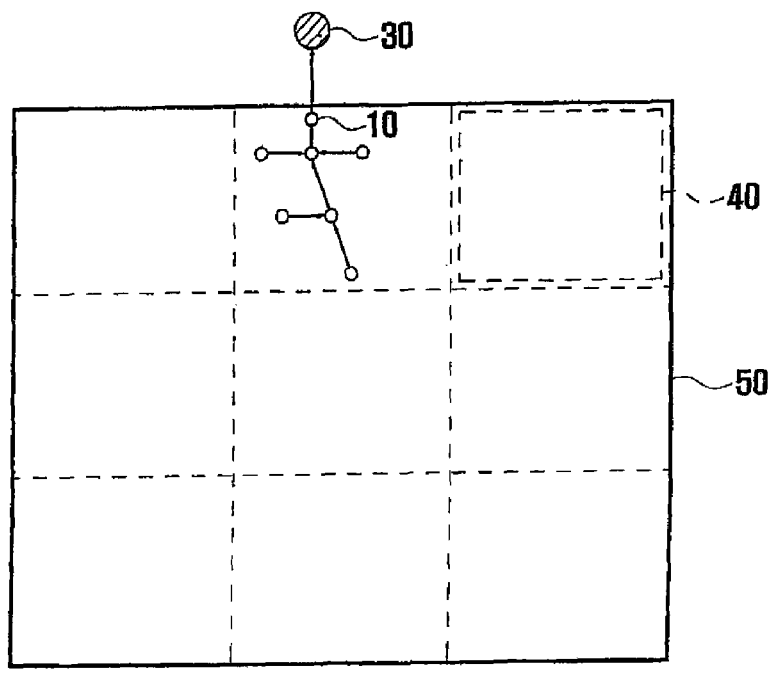
FIG. 2 shows a network system having a cluster according to an embodiment of the present invention.

FIG. 2 shows a network environment according to an embodiment of the present invention. FIG. 3 is a flowchart showing an initial operation process in a sensor network according to an embodiment of the present invention. FIG. 4 is a flowchart showing a cyclic operation process in a sensor network according to an embodiment of the present invention.

It is assumed in the following description that the sensor network according to the present invention has an initial operation process and a cyclic operation process and that "i" refers to the number of each sensor node 10.

Figure 3:
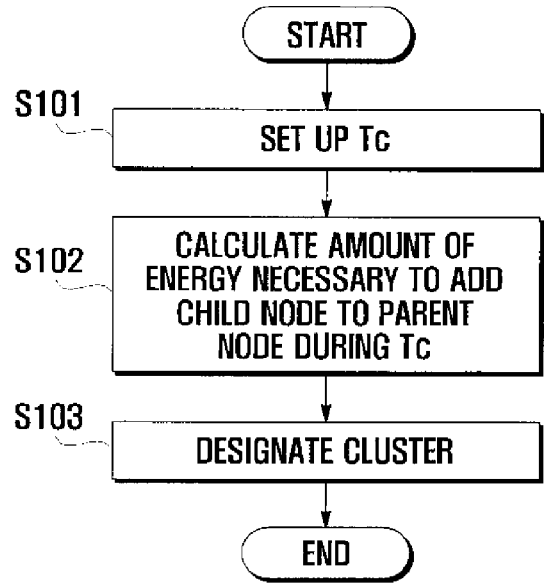
FIG. 3 is a flowchart showing an initial operation process for determining the maximum number of allowable links according to an embodiment of the present invention.
Figure 4:
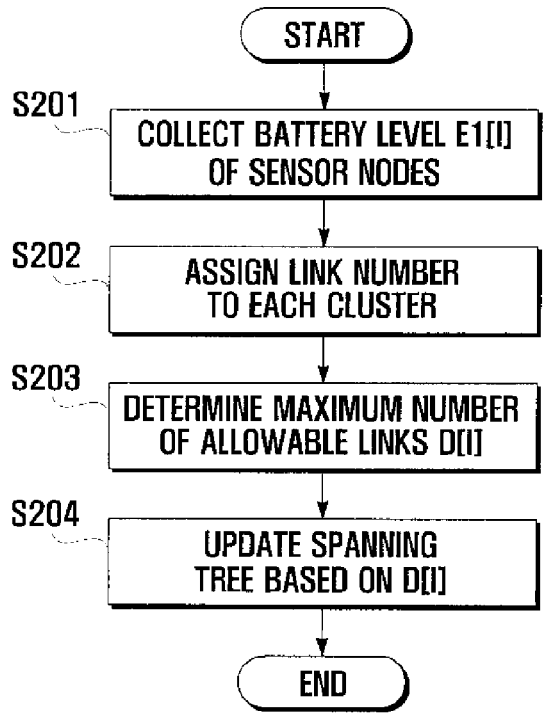
FIG. 4 is a flowchart showing a cyclic operation process for determining the maximum number of allowable links according to an embodiment of the present invention.

Referring to FIGS. 2 and 3, during the initial operation process, period $T_c$, for which a created spanning tree is used, is determined (S101); and the amount of energy ($T_c \times E_r$) that a sensor node 10 must additionally consume to add an child node during period $T_c$ is calculated (S102). In this case, $E_r$ refers to the amount of energy determined in the product development stage or mass production stage.

Alternatively, $T_c$ may be defined as a round cycle at which each sensor node 10 transmits data or a cycle obtained by dividing the entire life of the sensor network 50 at a predetermined proportion determined by the BS 30 (S101).

During the initial operation process, a sensor field, which refers to a space constituting each sensor network 50, is divided into a plurality of regions (e.g., 5-10 regions), each of which is assigned to a sensor node 10 according to the location. The set of all sensor nodes 10 belonging to a region is referred to as a cluster 40 (S103).

The size of the cluster region corresponds to ⅕-1/10 that of the sensor network 50 (S103).

Referring to FIGS. 2 and 4, during the cyclic operation process according to an embodiment of the preset invention, all sensor nodes 10 report their current energy or battery level, E1[i], to the BS 30 in a time domain for creating a new routing path (S201).

Then, the BS 30 assigns link number L[j] to each cluster 40 (S202).

The link number L[j] can be obtained by rounding off $(1+x/100)*N[j]$ when x % of links are free (S202). In this case, N[j] refers to the number of sensor nodes belonging to the $j^{th}$ cluster.

The percentage of free links defines what percentage of links L[j] assigned to the cluster 40 are free, particularly the number of free links necessary to constitute the spanning tree of a cluster 40. The number of free links must be larger than that of actual links used in a cluster 40, and is used by the BS 30 to calculate the number of possible cases of a specific sensor node 10 with regard to the spanning tree of a cluster 40. For example, when an upper sensor node has three free links, the number of actual links the upper sensor node has may be 2 because the number of free links is used to calculate various spanning trees.

Then, the BS 30 determines the maximum number D[i] of links allowed to every sensor node 10 belonging to each cluster 40 (S203), and updates the spanning tree among sensor nodes 10 inside the cluster 40 based on the determined D[i] (S204).

The method for determining the maximum number of allowable links (S203) may be solely based on the amount of remaining energy of sensor nodes within the cluster (first method) or based on consideration of relative size of the amount of remaining energy E1[10](second method). The second method is preferably used when the sensor network 50 is large (e.g. at least 10 hectare).

A method for determining the maximum number of allowable links will now be described in more detail with reference to FIGS. 5 and 6.

It is assumed in the following description that i refers to a sensor node number; j refers to a cluster number to which sensor node i belongs; and relative rank R[i] refers to a rank in $\{1, 2, \ldots, N[j]\}$.

FIG. 5 is a flowchart showing a first method using the relative rank R[i] of the amount of remaining energy (S203).

Referring to FIG. 5, the first method begins by sorting the relative rank R[i] of the amount of remaining energy in the ascending order (S301).

Then, standard decimal P[i] is obtained based on the relative rank R[i] of sensor node i and equation (1) below (S302). In this case, P[i] satisfies 0<P[i]<1.

$$P[i]=(R[i]-0.5)/N[j] \qquad (1)$$

The maximum number of allowable links D[i] is determined based on Table 1 below.

| x(%)/P | 0-0.2 | 0.2-0.3 | 0.3-0.5 | 0.5-0.9 | 0.9-1.0 |
|---|---|---|---|---|---|
| 10 | 1 | 1 | 2 | 3 | 3 |
| 15 | 1 | 2 | 2 | 3 | 3 |
| 20 | 1 | 2 | 2 | 3 | 4 |

Table 1 is based on the standard deviation of the amount of remaining energy of sensor nodes 10 with regard to the percentage x of free links, and may vary for each cluster.

A first method according to the present invention will now be described in more detail with reference to FIGS. 6a to 6f.

FIGS. 6a to 6f show examples of a cluster 40 in a network environment for illustrating a first method according to an embodiment of the present invention.

In the illustrated case, each sensor node is denoted by a circle; the number in each circle refers to the amount of remaining energy of the corresponding sensor node; the number near each circle refers to the number of the corresponding sensor node; a solid line refers to a link formed between sensor nodes and an arrow refers to the direction of data transmission so as to differentiate between a child node and a parent node. In addition, it is assumed that the amount of remaining energy of each sensor node is 100 and that no energy is consumed for data transmission. This means that the amount of energy consumed to receive and process data based on the link number is solely considered. In short, the energy consumption depends on the link number.

Figure 6A:
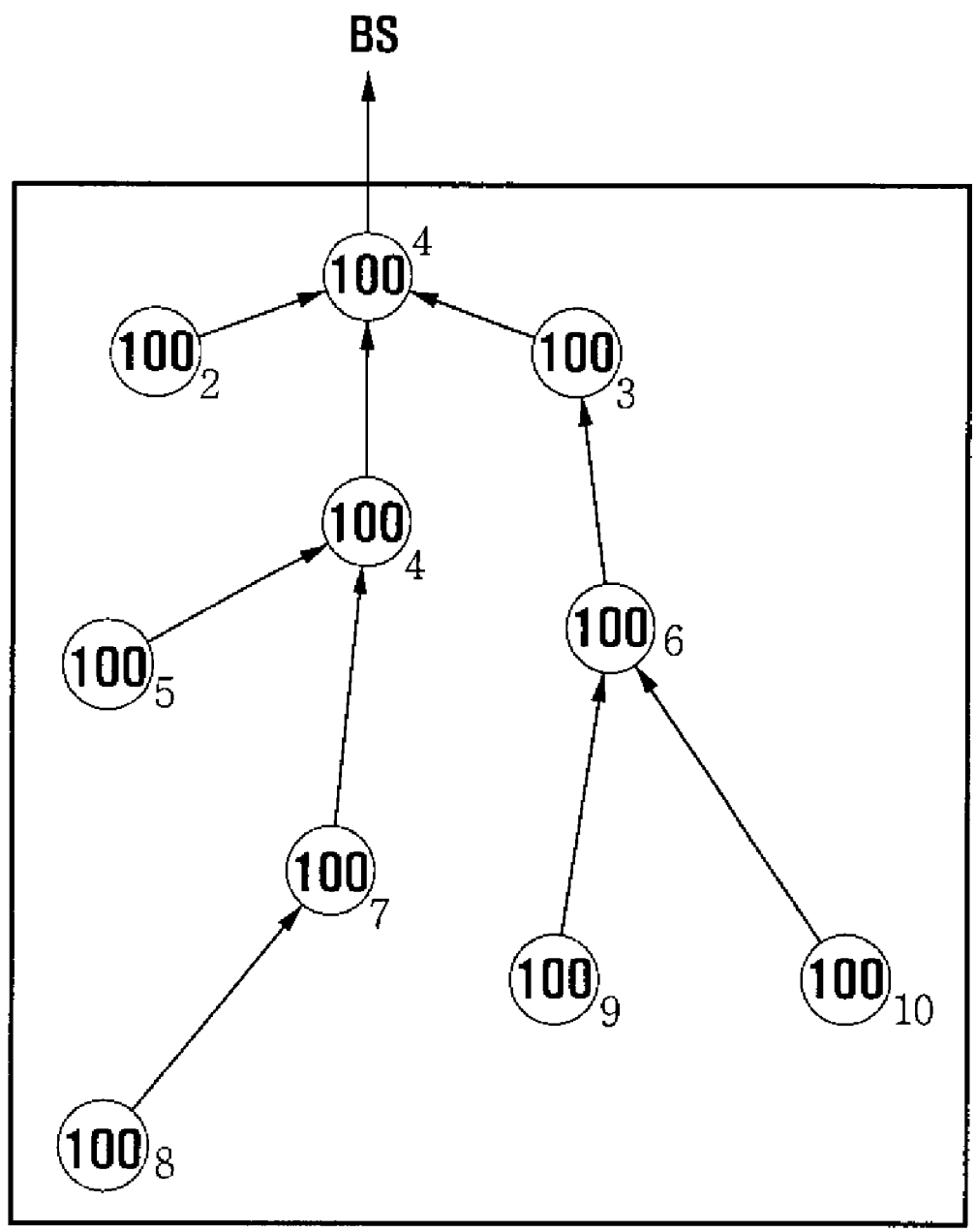
FIGS. 6a to 6f show a network system to which the method according to the present invention is applied.

Referring to FIG. 6a, the first node 1 is a handling node adapted to transmit data to the BS; the nodes 3, 4, 6, and 7 are parent nodes; and nodes 2, 5, 8, 9, and 10 are child nodes.

Figure 6B:
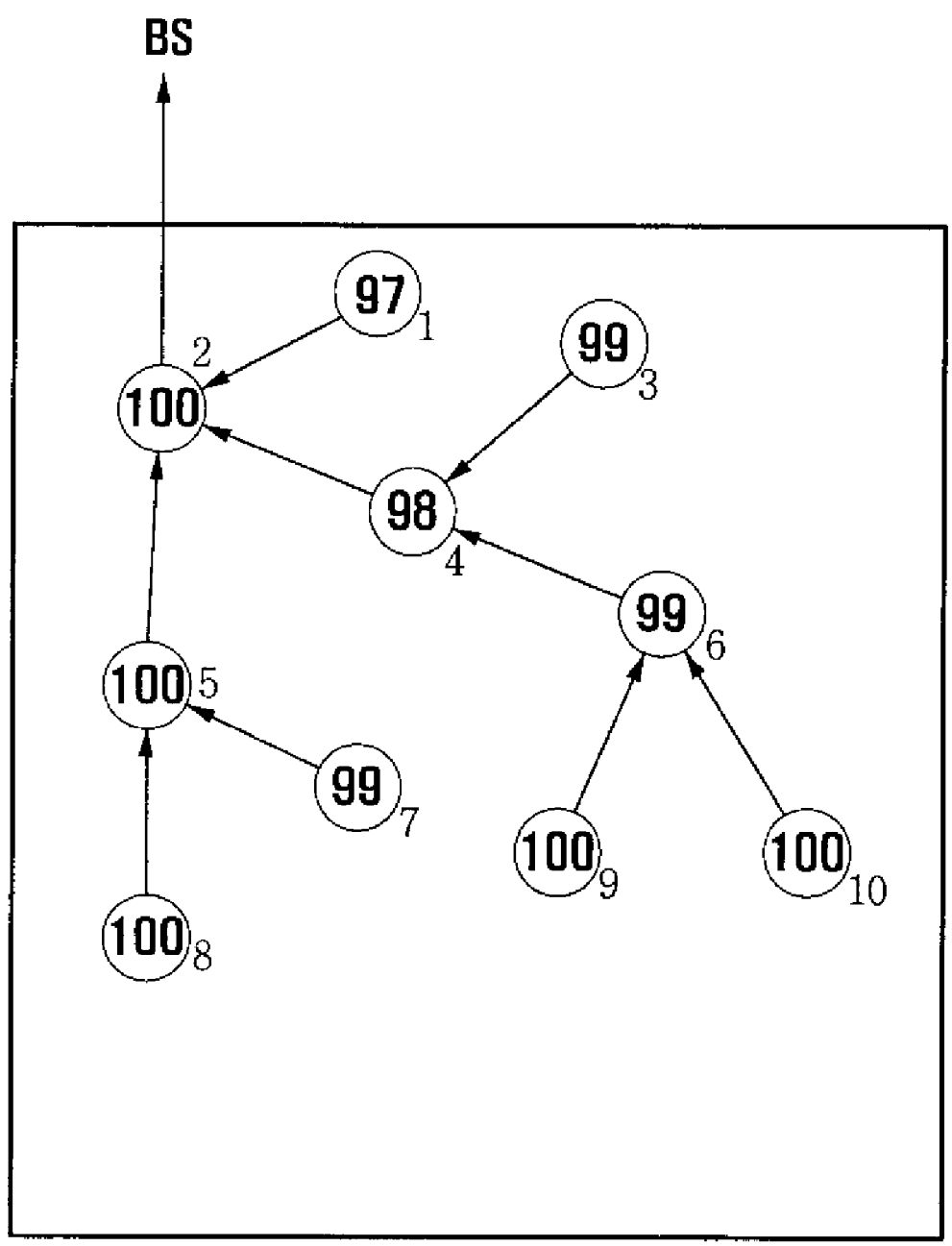

Further the amount of remaining energy of a parent node reduces as much as its link number, and the distribution of the amount of remaining energy is as follows: the node 1 is 97 energy level, node 3 is 99 energy level, node 4 is 98 level, etc, as shown in FIG. 6b. Based on the amount of remaining energy of respective sensor nodes included in a cluster, the BS calculates the maximum number of links allowed to each sensor node based on equation (1). Then, the BS reconfigures the spanning tree using the calculated maximum number of allowable links, as shown in FIG. 6b.

Figure 6C:
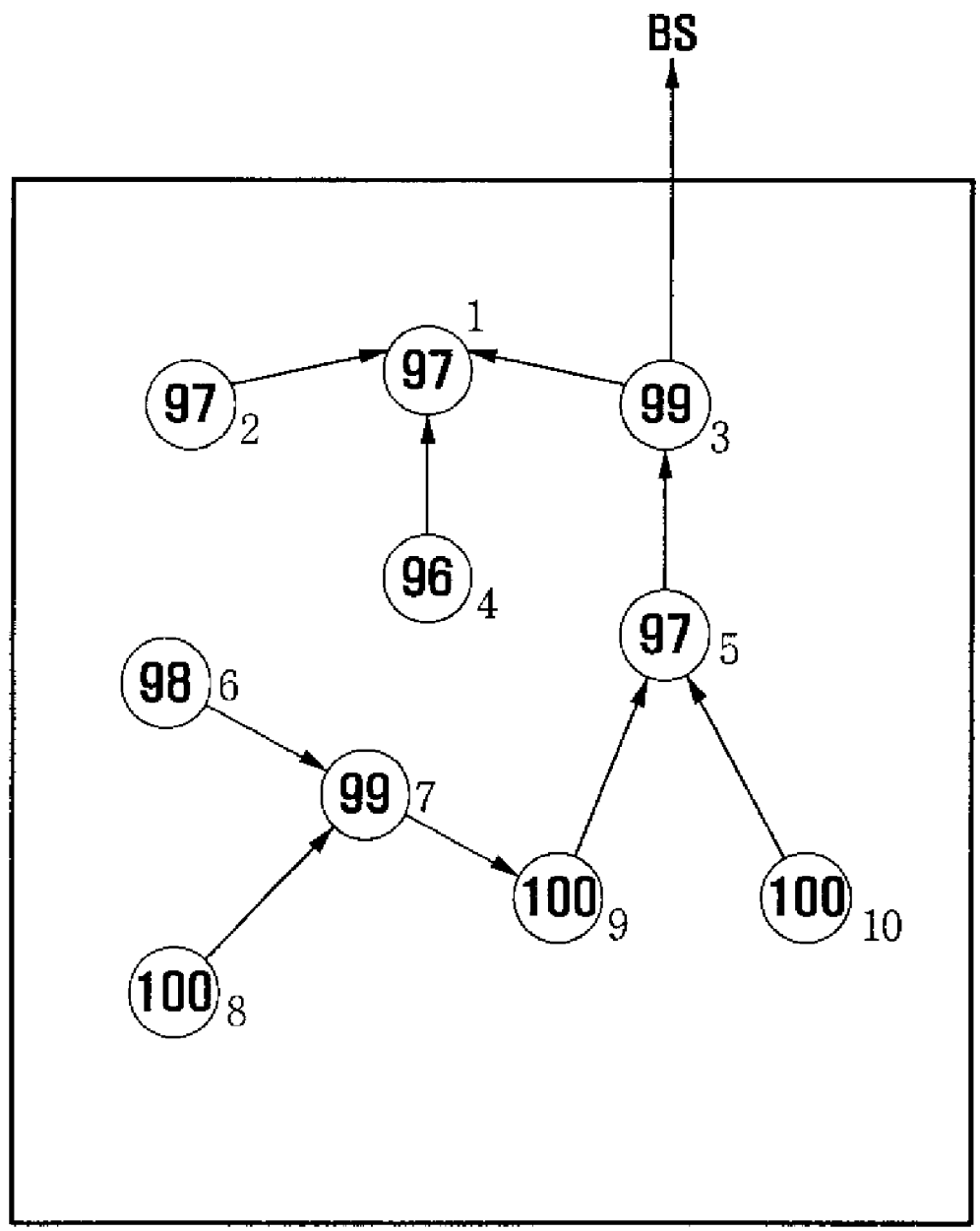

After data is transmitted, using the spanning tree shown in FIG. 6b, the amount of remaining energy of each sensor node is distributed as shown in FIG. 6c. Particularly, node 3 becomes a handling node adapted to transmit data to the BS; and nodes 1, 5, 7, and 9 are determined to be parent nodes and form new spanning trees, respectively.

Figure 6D:
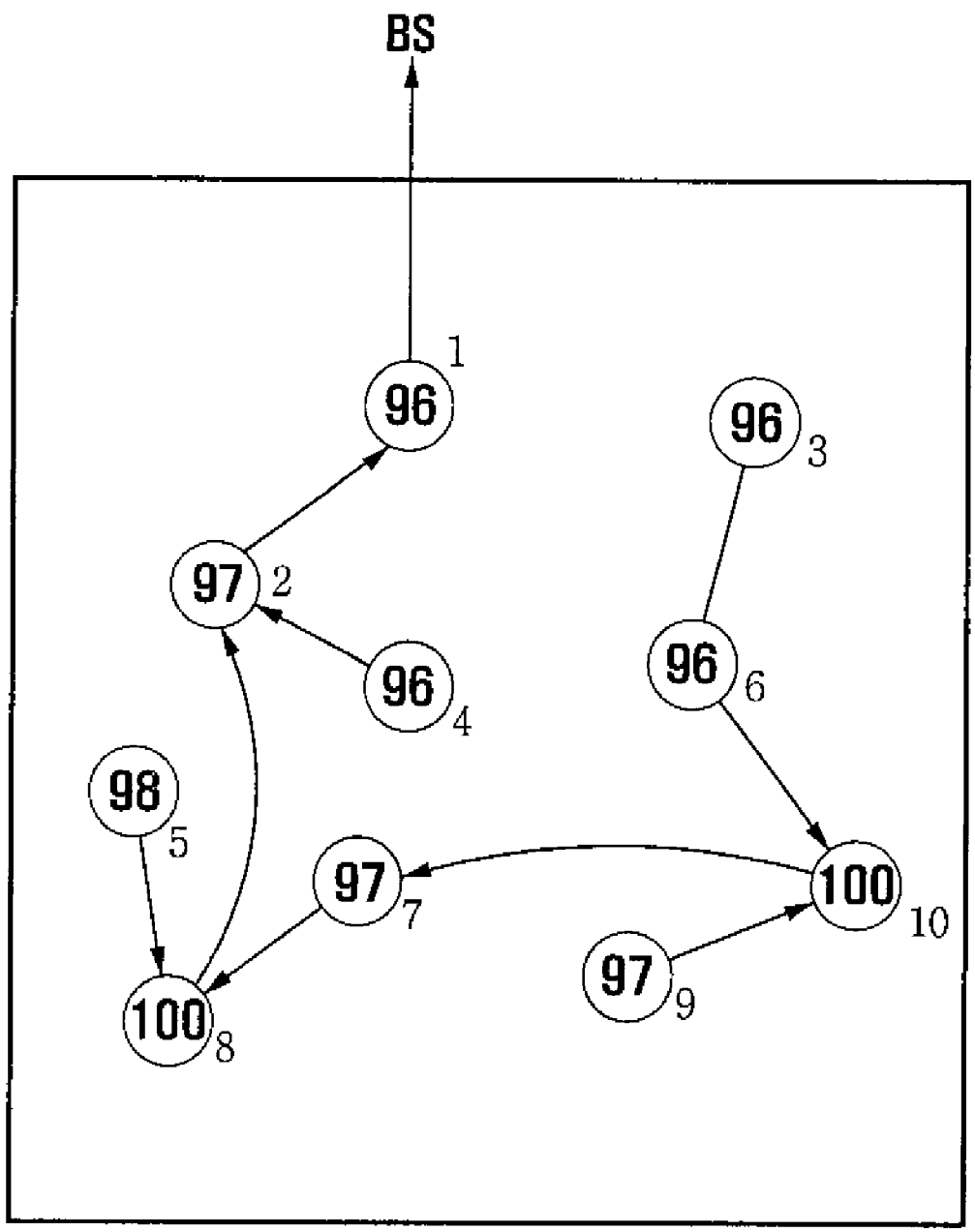
Figure 6E:
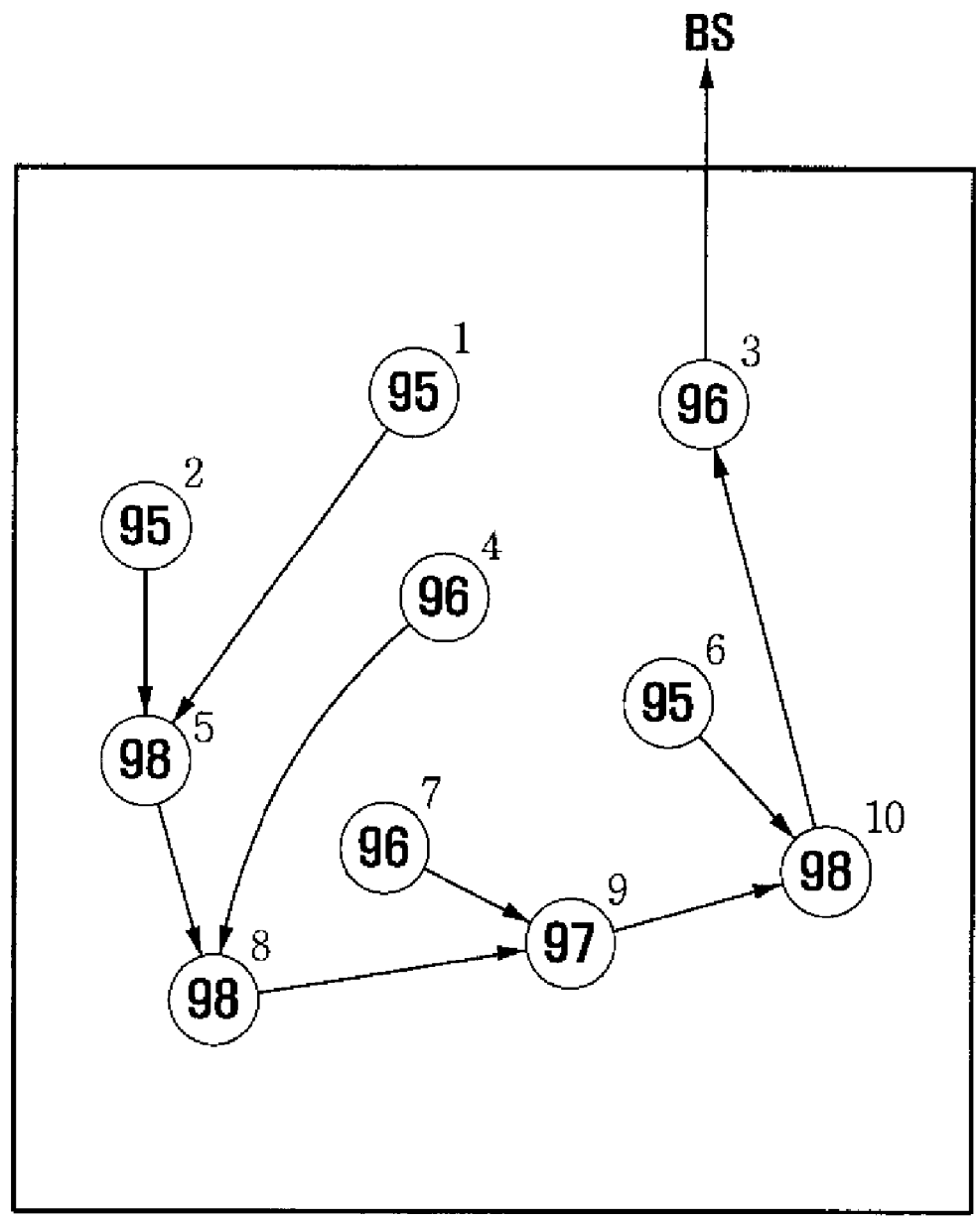

After cycle $T_c$, the spanning tree shown in FIG. 6c has a distribution of remaining energy as shown in FIG. 6d; and a new spanning tree is formed as shown in the drawing. In FIG. 6e, a spanning tree is similarly formed based on the distribution of remaining energy of each sensor node.

Figure 6F:
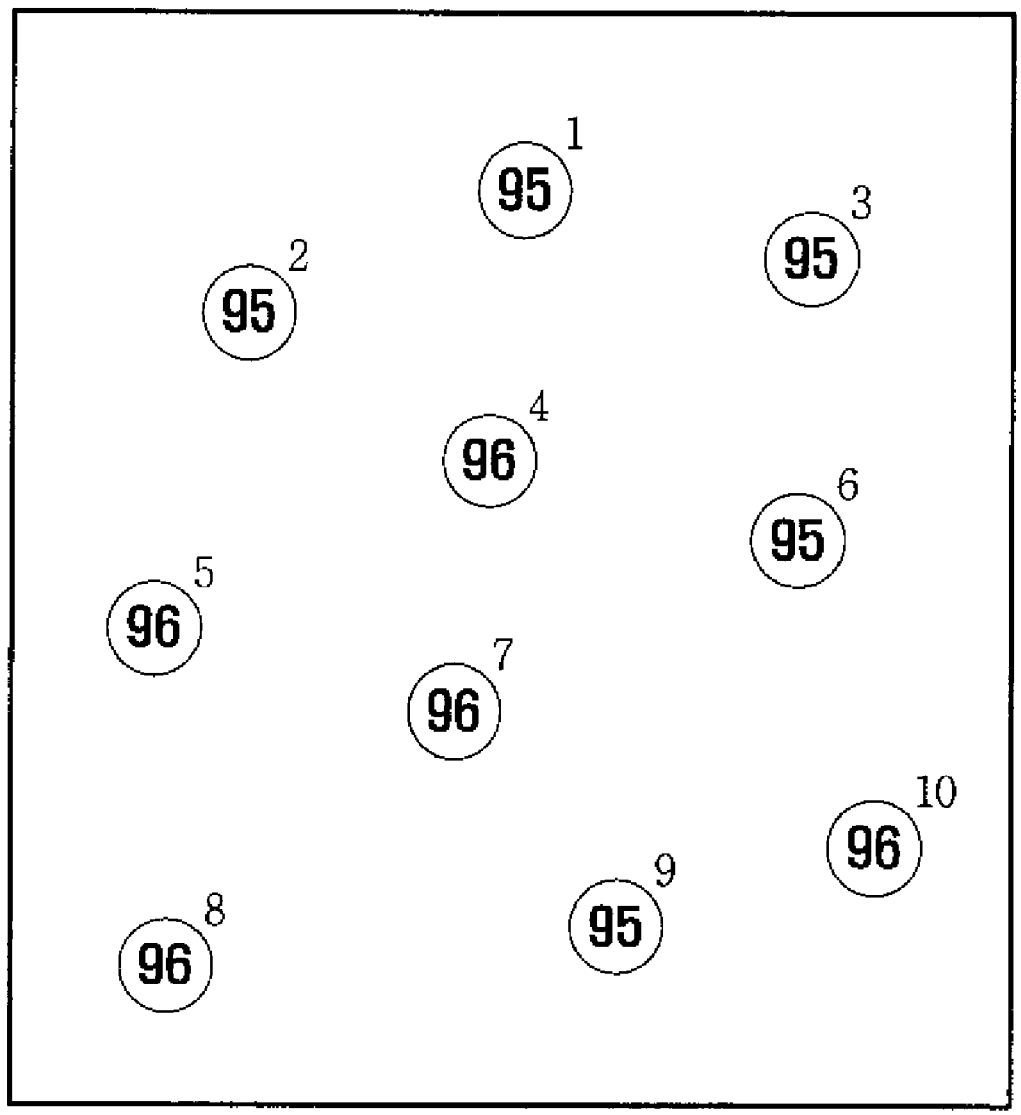

From FIG. 6f the amount of remaining energy of each sensor node is 95 or 96, which means that all sensor nodes have a substantially similar level of remaining energy.

Figure 7:
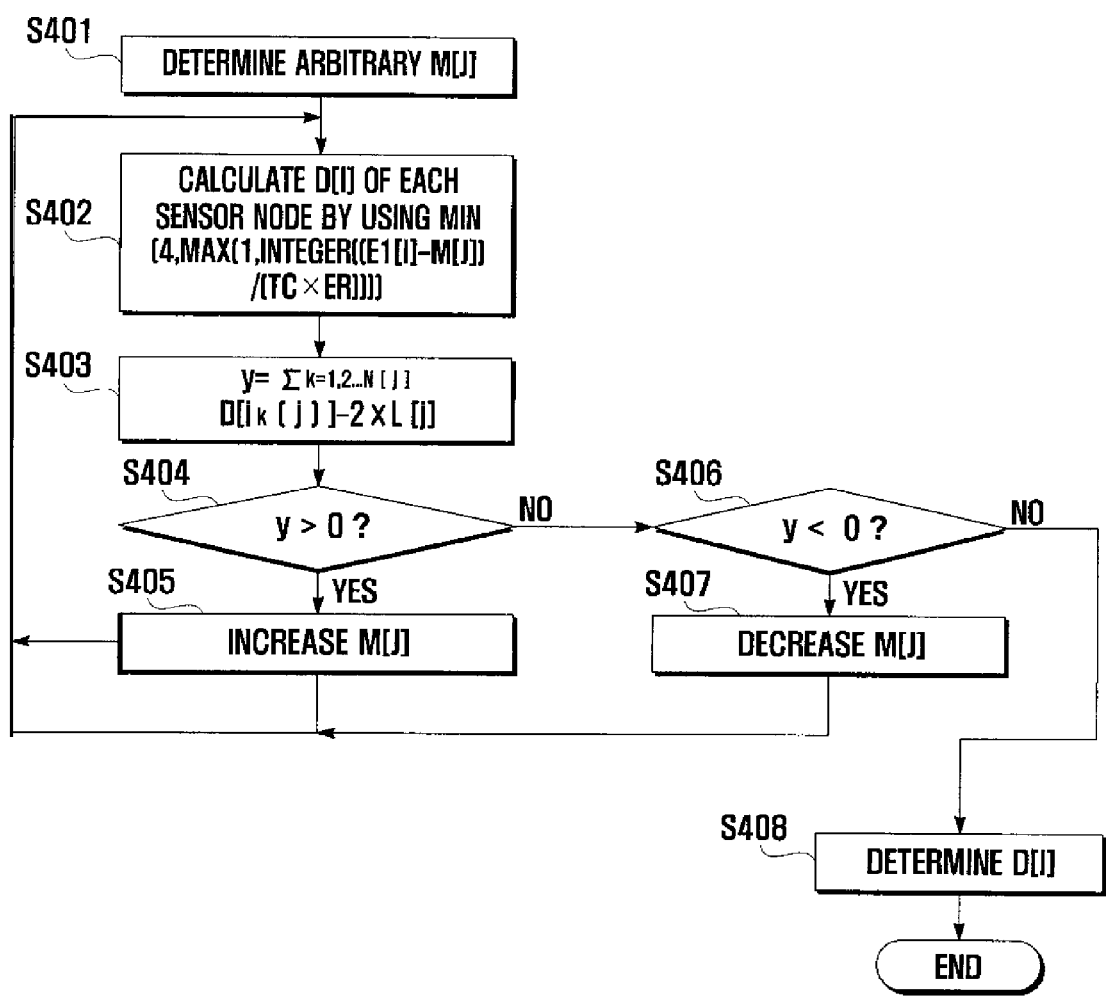
FIG. 7 is a flowchart showing a second method for determining the maximum number of allowable links according to an embodiment of the present invention.

FIG. 7 is a flowchart showing a second exemplary method for determining the maximum number of allowable links based on consideration of the amount of remaining energy (S203) according to an embodiment of the present invention.

Referring to FIG. 7, considering that the percentage x of free links cannot be adjusted solely based on the amount of remaining energy, the second method begins by determining an auxiliary variable m[j] so as to adjust the link number L[j] of each cluster 40 (S401). Particularly, m[j] is a single variable commonly used in a cluster 40, and its value is repeatedly changed until desired D[i] is obtained, as defined by equation (2) below.

$$
\begin{aligned}
&S402.\ D[i]=\min(4,\max(1,\text{integer}((E1[i]-m[j])/T_c \times E_r)))) \\
&S403.\ y=\Sigma_{k=1,2,N[j]}D[i_k(j)]-2\times L[j] \\
&S404.\ y>0:\ \text{increase } m[j] \text{ properly, and return to step 1} \\
&\qquad (S405) \\
&S406.\ y<0:\ \text{decrease } m[j] \text{ properly, and return to step} \\
&\qquad 1(S407) \qquad\qquad\qquad\qquad\qquad\qquad\qquad (2)
\end{aligned}
$$

The function min( ) and max( ) must be determined so that D[i] has a value between 1 and 4(S402). In addition, the function integer (k) rounds off real number k to obtain an integer In step 2, $i_k(j)$ refers to the node number of a sensor node belonging to cluster j.

Then, equation (2) is used to determine the entire D[i] (S408).

The method and system for managing energy in a sensor network environment using a spanning tree according to an embodiment of the present invention determines the maximum number of allowable links in the above-mentioned manner, and calculates a new spanning tree of the sensor network 50 based on the calculated number. As a result, among the sensor nodes 10 of the sensor network 50, which periodically have a new spanning tree, those handling a load are replaced by others, so that the load is distributed substantially uniformly. This uniformizes the amount of energy consumed by the sensor nodes. Particularly, according to the inventive method and system for managing energy, nodes consuming energy faster than others are entrusted with a role consuming less energy, and those consuming energy more slowly are entrusted with a role consuming more energy.

As such, the present invention is advantageous in that, in a sensor network environment in which energy consumption is actively determined based on the link number, the maximum number of links allowed to each sensor node is updated based on at least one of the amount of remaining energy and the rank of the amount of remaining energy so that the link connection of a spanning tree is newly constructed. This lengthens the life of the entire sensor network and improves the reliability of data collected from the sensor network.

The above-described methods according to the present invention. can be realized in hardware or as software or computer code that can be stored in a recording medium such as a CD ROM, an RAM, a floppy disk, a hard disk, or a magneto-optical disk or downloaded over a network and stored on a non-transitory medium such as the aforementioned, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A method of managing energy in a sensor network environment using a spanning tree, the method comprising:
    collecting an amount of remaining energy of each of a plurality of nodes in the sensor network at a predetermined cycle by a base station in a region having a number of clusters, a number of nodes forming a spanning tree in each cluster;
    assigning a number of links for connecting the nodes to each cluster;
    determining a maximum number of allowable links of the nodes according to the amount of remaining energy of each node; and
    updating the spanning tree based on the maximum number of allowable links;
    wherein the maximum number of allowable links is a predetermined percentage of free links; and wherein the percentage of free links is determined based on a standard deviation of distribution of the amount of remaining energy of the nodes.

2. The method as claimed in claim 1, further comprising:
    setting up the predetermined cycle for updating the spanning tree; and
    calculating amount of energy necessary to add a node to a different node during the predetermined cycle.

3. The method as claimed in claim 2, wherein the predetermined cycle is at least one of, a round cycle, the node transmitting data to the base station at the round cycle, and a cycle obtained by dividing entire sensor network life at a predetermined ratio.

4. The method as claimed in claim 1, wherein the cluster has a size corresponding to 1/5-1/10 of a size of the region.

5. The method as claimed in claim 1, wherein the assigning a number of links comprises:
    determining a percentage of free links in the cluster by the base station; and
    determining a link number by adding a number of nodes located at the cluster and a percentage of free nodes located at the cluster together.

6. The method as claimed in claim 5, which further comprises:
    determining the link number by rounding down a total when the total has a decimal value.

7. The method as claimed in claim 1, wherein the percentage of free links corresponds to 10%-20% of a total number of allowable links of all, nodes arranged in the cluster.

8. The method as claimed in claim 1, wherein the step of determining a maximum number of allowable links of the nodes comprises:
    sorting nodes located at the cluster according to a relative rank of amount of remaining energy of the nodes;
    calculating a standard decimal number based on the relative rank; and
    determining the maximum number of allowable links based on the standard decimal number and the percentage of free links.

9. The method as claimed in claim 8, wherein the standard decimal number P[i] of the node is (relative rank-0.5)/node number of cluster where i refers to node number.

10. The method as claimed in claim 9, wherein the maximum number of allowable links is determined based on a table for determining the maximum number of allowable links, the table having been prepared based on the standard decimal number and the percentage of free links.

11. The method as claimed in claim 1, wherein the determining a maximum number of allowable links of the nodes comprises:
    calculating the maximum number of allowable links D[i] by as $$\min(4, \max(1, \text{integer}((E1[i]-m[j])/(T_c \times E_r)))),$$

wherein D[i] refers to the maximum number of allowable link,
    min(x) outputs x value when equal to or smaller than the x value,
    max(y) outputs y value when equal to or larger than the y value,
    E[i] refers to amount of remaining energy of $i^{th}$ node,
    m[j] refers to a variable,
    $T_c$ refers to a cycle,
    $E_r$ refers to energy necessary to add a node to a different node,
    L[j] refers to a link number assigned to the cluster, \ integer(k) rounds off k so as to obtain an integer, and
    $i_k(j)$ refers to a number of a node belonging to a cluster;
    calculating second value as $\backslash\Sigma_{k=1,2,N[j]} D[i_k(j)]-2\times L[j]$;
    increasing the m[j] by a predetermined amount when the second calculated value is larger than 0 and repeating the calculation of the maximum value; and
    decreasing the m[j] by a predetermined amount when the second calculated value is smaller than 0 and repeating the calculation of the maximum value.

12. The method as claimed in claim 1, wherein the spanning tree is updated by constructing a tree based on, consideration of the amount of remaining energy and location of nodes distributed in the cluster.

13. The method as claimed in claim 1, wherein the updated spanning tree has a link number equal to or smaller than the maximum number of allowable links in a previous spanning tree.

14. A system for managing energy in a sensor network environment using a spanning tree, the system comprising:
    a plurality of nodes forming a spanning tree in each region based on link connection, the nodes updating the spanning tree at a predetermined cycle; and
    a base station for:
        setting up the predetermined cycle, collecting amount of remaining energy of the nodes and distributed location of the nodes at the predetermined cycle so as to determine a maximum number of allowable links of the nodes, calculating the spanning tree based on the determined maximum number of allowable links according to the amount of remaining energy of each node, and transmitting a calculation result to the nodes;

wherein the maximum number of allowable links is determined by sorting nodes located at a cluster according to a relative rank of amount of remaining energy of the nodes and referring to a predetermined percentage of free links determined based on standard deviation of distribution of amount of remaining energy of the nodes and a standard decimal number calculated based on the relative rank.

15. The system as claimed in claim 14, wherein the base station comprises a processor executing code stored on a machine readable storage medium for:

determining the maximum number of allowable links as $$\min(4, \max(1, \text{integer}((E1[i]-m[j])/(T_c \times E_r)))),$$

wherein D[i] refers to the maximum number of allowable link, min(x) outputs x value when equal to or smaller than the x value, max(y) outputs y value when equal to or larger than the y value, E[i] refers to amount of remaining energy of $i^{th}$ node, m[j] refers to a variable, $T_c$ refers to a cycle, $E_r$ refers to energy necessary to add a node to a different node, L[j] refers to a link number assigned to the cluster, integer(k) rounds off k so as to obtain an integer, and $i_k(j)$ refers to a number of a node belonging to a cluster;

calculation of the calculated values by using equation $$\Sigma_{k \times 1, 2, N[j]} D[i_k(j)] - 2 \times L[j];$$

increase of the m[j] by a predetermined amount when the secondarily calculated value is larger than 0 and repetition of the primary calculation; and decrease of the m[j] by a predetermined amount when the secondarily calculated value is smaller than 0 and repetition of the primary calculation.

16. A base station for managing energy in a sensor network environment, said base station comprising:

a processor in communication with a memory, the processor executing code stored on a machine readable storage medium for:

collecting information regarding an amount of remaining energy in each of a plurality of nodes and their respective location in said network at a predetermined cycle so as to determine a maximum number of allowable links of the nodes, calculating a spanning tree based on the determined maximum number of allowable links according to the amount of remaining energy of each node, and transmitting a calculation result to each of the nodes;

wherein said maximum number of allowable links is determined as:

$$\min(4, \max(1, \text{integer}((E1[i]-m[j])/(T_c \times E_r)))),$$

wherein D[j] refers to the maximum number of allowable link, min(x) outputs x value when equal to or smaller than the x value, max(y) outputs y value when equal to or larger than the y value, E[i] refers to amount of remaining energy of $i^{th}$ node, m[i] refers to a variable $T_c$ refers to a cycle, $E_r$ refers to energy necessary to add a node to a different node, L[j] refers to a link number assigned to the cluster, integer(k) rounds off k so as to obtain an integer, and $i_k(j)$ refers to a number of a node belonging to a cluster;

calculation of the calculated values by using equation $$\Sigma_{k \times 1, 2, N[j]} D[i_k(j)] - 2 \times L[j];$$

increase of the m[j] by a predetermined amount when the secondarily calculated value larger than 0 and repetition of the primary calculation; and decrease of the m[j] by a predetermined amount when the secondarily calculated value is smaller than 0 and repetition of the primary calculation.

\* \* \* \* \*